United States Patent [19]

Muusse

[11] 4,397,080
[45] Aug. 9, 1983

[54] PROCESS FOR PREPARATION OF SUPPORT TOOLING FOR EXTRUSION DIES

[75] Inventor: Jay H. Muusse, Spring Lake, Mich.

[73] Assignee: Me-U-Sea, Inc., Spring Lake, Mich.

[21] Appl. No.: 205,731

[22] Filed: Nov. 10, 1980

[51] Int. Cl.³ .................. B22D 11/126; B21K 5/20; B22C 9/02

[52] U.S. Cl. .................. 29/527.6; 72/467; 76/107 A; 164/34; 148/2

[58] Field of Search .................. 148/2, 3; 76/107 R, 76/107 A; 164/34, 35, 36; 72/467; 29/527.6

[56] References Cited

U.S. PATENT DOCUMENTS

| | | | |
|---|---|---|---|
| 1,684,102 | 9/1928 | Leustig et al. | 72/467 |
| 2,830,343 | 4/1958 | Shroyer | 22/196 |
| 3,248,972 | 5/1966 | Beghi | 76/107 A |
| 3,561,104 | 2/1971 | Holtan et al. | 29/527.6 |
| 3,572,421 | 3/1971 | Mezey et al. | 164/34 |
| 3,766,969 | 10/1973 | Mezby et al. | 164/34 |
| 3,914,981 | 10/1975 | Nilsson et al. | 72/467 |
| 4,060,120 | 11/1977 | Takahashi et al. | 164/35 |
| 4,081,019 | 3/1978 | Kulig | 164/34 |
| 4,241,625 | 12/1980 | Corbin et al. | 76/107 A |

Primary Examiner—Francis S. Husar
Assistant Examiner—V. K. Rising
Attorney, Agent, or Firm—Waters, Lesniak & Willey

[57] ABSTRACT

A process for preparation of support tooling for extruding dies is described in which a substantial reduction in machining is experienced by utilizing a pattern destroying precision casting system in which the pattern is adjusted to shrinkage and provided with a die orifice opening staged up in size to suit the particular support role of the tooling as in a backer or bolster. This is significant because such support elements are regarded as one-of-a-kind structures. Finish machining and treatment requires minimal time and at substantial energy reduction. The pattern is prepared from a destructible or vaporizable plastic material replaced by the molten metal conforming to the mold configuration.

3 Claims, No Drawings

PROCESS FOR PREPARATION OF SUPPORT TOOLING FOR EXTRUSION DIES

The present invention relates to a process or method for preparing support tooling for extrusion dies and in particular for extrusion dies used in extruding metals such as aluminum, magnesium, copper, bronzes, and brasses. The concepts of the process may also be applied to steel, tungsten, molybdenum titanium and exotic alloys.

The process is directed to the casting of backers and bolsters for extrusion dies in which machining is reduced to an absolute minimum and in which cost is dramatically reduced while providing a level of support tool accuracy well within the operating specification limits. This is regarded as particularly significant in an industry where support tooling elements are seen as one-of-a-kind.

In the prior art, the back-up or support tooling for extrusion dies has been produced from Chromium Steels such as AISI: $H_{11}$, $H_{12}$ and $H_{13}$ and 4340 and where the steels are forged, then cut off in cylindrical slugs, exposed to substantial grinding and machining to provide parallelity in both planar faces, is thereafter turned to provide a true circumference, milled as required to provide perimeter slotting and machined to provide threaded radial and transverse fixturing and retention means. The central or axial opening, similar to the profile of the extrusion die opening and enlarged, was provided by a die sinking type operation, not unusually by electromachining or grinding. Then the structure is hardened to suit a Rockwell Hardness of about 44 or better on the C scale (44Rc). These procedures are characteristic of one-of-a-kind production. The procedures were substantially identical for the backer and for the bolster differing only in the details of fixturing and the intricacy of the axial openings and desired thickness of the tooling.

A function of satisfactory extrusion has always been found in the support tooling so as to provide adequate buttressing of the extrusion die against the enormous pressure required to flow the metal or extrudable material through the orifice defined by the extrusion dies to meet the dimensional tolerance established for the particular metal. This tooling is prepared from AISI Steel: $H_{11}$, $H_{12}$ and $H_{13}$, 4340 compatible with the extrusion die material and hardened to Rockwell (Rc) 44 or better. The usual tooling stack comprises the extrusion die itself; the backer next adjacent the die and on the downstream side thereof; and the bolster adjacent the backer downstream of the backer and frequently keyed together with the backer and die for alignment and orientation and is retained by a die ring holding the stack in alignment and for replacement and removable.

In general, the support tooling is in the form of cylindrical blocks of steel, each axially oriented register in respect to the prior unit (die, bolster, backer) and each having a center opening therethrough in registry with the die opening and of increased dimensions since the tooling does not contact the extrusion but buttresses the die and usually on the downstream side. While the precision of the die opening or orifice is not required in the center opening, the techniques of manufacture of the support tooling is substantially identical to the procedures for forming the die with less attention to surface finish and die tolerance and more attention to flush registering contact against the outer face of the die and to parallelity and axial registry with the die and downstream elements.

Unlike the preparation of prior art support tooling, the process here is a process which utilizes full mold casting steps in preparation of a cast backer or bolster or other extrusion die support tooling such as die rings and dummy blocks and wherein the pattern for the foundry casting is formed or carved from a log of foamed plastic (such as foamed styrene or foamed urethane) to a shrinkage-adjusted pattern including a central opening sized larger than the die orifice but similarly configured and generally extending through the backer and bolster thickness and substantially on the axes thereof. The thus formed destruct pattern is usually coated with a refractory bath, coating the exterior of the pattern and enhancing surface finish in the cast support element.

In general, the process comprises the steps of full mold casting to destruct a pattern configured to the final form of the support tooling element; and then finish machining the thus cast support tooling element by suitable hardening and machining to parallelity of faces, cleaning up of slots and keyways, and trueing of circumference as by milling, grinding or combinations of these.

The destruct pattern is of vaporizable material destructively acted upon by entry of the casting metal to the mold formed around the pattern and the pattern material is selected for easily being formed into the final size (shrinkage adjusted) and configuration of the desired support tooling and including slots, keyways, and ceramic threaded inserts where desired. The vaporizable material most frequently used is a foamed plastic such as, but not limited to, the foamed styrene or polystyrenes, and the foamed urethanes. These organic compounds have sufficient rigidity for easy cutting and shaping as by the use of hot wires or simple forming and casting tools and may be built up from segments or blocks of the foamed plastic material adhered together with organic cements or the like. Typically, a cylindrical support element, such as a bolster or backer, is exactly reproduced in the foamed plastic, and is adjusted for shrinkage, by passing a hot wire through the center of the pattern piece cut from a segment of a foamed plastic elongate cylinder. The wire is then traced through the pattern stock by use of a templet or form coinciding with the actual extrusion die orifice or opening. The plug thus formed is removed and the size of the opening left is increased by an increment desired in the particular support tooling element and is similar in other regards to the die orifice. Suitable registry is easily established as between die and backer or bolster and hot wires are used to cut away keyways in the perimeter or to provide openings therethrough in which ceramic or metal threaded inserts are supported. The outer perimeter is easily established by turning the pattern on a turning table against a fixed hot wire blade. Thus formed in respect to the desired finished support tooling element, the pattern is then positioned in a flask where molding sand or molding composition is placed around and in support of the pattern and a suitable riser and/or gating system is provided so that a sprue is available to the pattern.

The preparation of the center opening or aperture in the backer or bolster element pattern is achieved with a templet (about ⅛ inches thick) scribed with the centers and having a redrawn dimension and including shrink percentage of the opening with registry assured by means of the keyways. The centerlines are also established on the pattern surface and the templet is placed on a tracing machine. By using circular rotary spacers, an identical form or configuration is traced on the pattern in a size increased in accord with the size of the spacer. Usually in aluminum extrusion usage, the backer is one-eighth (⅛) of an inch over the die aperture size and in the bolster one-quarter (¼) inch larger than the die orifice or aperture exit dimension.

Thereafter, the casting generally follows the full mold process and reference is had to the U.S. Pat. No. 2,830,343 to H. F. Shroyer. The molten metal is poured into the mold which is against the pattern and the pattern is destructed or vaporized upon contact with the metal and the metal fills the space occupied by the destructed pattern. In some respects, this portion of the procedure resembles the "lost was" processes except that the pattern is directly eliminated by the incoming metal.

The resultant rough formed support tooling element is removed from the mold, the sprue and risers are separated from the support tooling element and only light machining is required to dress the casting to useable size. Typically the casting is shot cleaned, heat treated or normalized to obtain desired Rockwell Hardness. The specific hardness selected is a function of the required hardness in the end use of the support tooling. Typical machining is by grinding to establish two spaced-apart parallel face surfaces, by grinding or milling to clean up the cast-in-place slots and keyways and the ceramic inserts are, of course, removed where ceramic inserts were employed to form threaded or transverse openings. Such threaded openings, whether by metal inserts or ceramic inserts, are chased or trued. A vertical mill is helpful in finish machinery on slots. Normally, the center opening (similar in configuration to the die opening but of increased dimensions) requires no finish machining. The perimeter surface of the support element is ground to establish roundness and axial concentricity so that in respect to adjacent tooling as dies and backer or bolster or both, the proper registry is maintained. This external tracing is easiest achieved by a lathe having a grinding attachment. The keyways or slots are dictated by specific tooling stack fixtures and assures alignment register between the center openings in the support tooling (as bolsters and backers) and to the die orifice in the die which the support elements will reinforce.

The metal used for pouring (in aluminum extrusion applications) is Chromium Steel (AISI) $H_{11}$, $H_{12}$, $H_{13}$, 4340 and the steel is hardened to Rockwell Hardness at or above about Rc 44.

As a matter of economy in foundry work, the support elements may be die cast from recycled metal from worn out dies and support or primary ingot can be used. The net effect is a substantial saving of energy and human resources to fashion one-of-a-kind extrusion tooling elements.

Since the extrusion tooling elements include a central orifice, metal savings and attendant energy conservation is experienced using the presently described process. This is most apparent in considering the extrusion support element as seen in the die rings. collaterally, where a specialty melt of steel is employed, the surplus steel can be quickly and economically channeled to the formation of dummy blocks in accord with the described procedures. These latter tooling elements are exemplary of the savings available in precision and elimination of heavy final machining.

As contrasted with former procedures of forging and machining of the forged billet substantial savings in time and money results from the presently described process with no sacrifice of requisite precision and strength. The process of the present invention extends to all extrusion a method of rapid preparation of support tooling mimicking the die orifice profile with suitable enlargement and without the laborious machining formerly required.

Having thus described my invention and specific embodiments thereof, others skilled in the art will readily perceive improvements, modifications and changes within the skill of the art and such improvements, modifications and changes are intended to be included within the spirit of the present invention limited only by the scope of my hereinafter appended claims.

I claim:

1. A process for preparation of support tooling for extrusion dies including the steps of:
   (1) sizing a foamed plastic pattern to include a central opening therethrough;
   (2) placing said plastic pattern in a flask and burying said pattern in sand with a sprue form connected to said pattern;
   (3) casting metal into said pattern cavity surrounded by said sand and vaporizing said foamed plastic and forming said metal to a cylindrical form in said sand;
   (4) parallelizing two spaced-apart faces of said cylindrical form by light machining of both faces;
   (5) trueing said form for concentricity about the cylinder axis;
   (6) hardening said form as desired;
   (7) mounting said cylindrical support form in support engagement for an extrusion die on the downstream side thereof, wherein said sizing is achieved by a hot wire to provide a cylindrical pattern including a uniformly configured central opening therethrough having the same configuration as the central opening of said extrusion die but of increased outer dimensions, said pattern having two spaced-apart parallel end faces.

2. A process of claim 1 wherein said hot wire sizing includes forming external alignment slots in the exterior surface of said pattern.

3. A process of claim 2 in which threaded inserts are placed in selected openings in the sidewall of said pattern to provide threaded openings in the sidewall of said support tooling.

* * * * *